(12) United States Patent
Crawford et al.

(10) Patent No.: US 8,078,524 B2
(45) Date of Patent: Dec. 13, 2011

(54) METHOD AND APPARATUS FOR EXPLAINING CREDIT SCORES

(75) Inventors: Stuart Crawford, Piedmont, CA (US); Andrew Flint, Berkeley, CA (US); Sharon Anne Hatcher, Larkspur, CA (US); Keith Owen Hillestad, White Bear Lake, MN (US); Thomas J. Quinn, San Francisco, CA (US); Michael William Rapaport, Houston, TX (US); Sue Ann Simon, Sonoma, CA (US); Michael Scott Steele, Berkeley, CA (US); Cheryl Lynne St. John, Petaluma, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1626 days.

(21) Appl. No.: 10/183,135

(22) Filed: Jun. 25, 2002

(65) Prior Publication Data

US 2003/0046223 A1    Mar. 6, 2003

Related U.S. Application Data

(63) Continuation-in-part of application No. 09/790,453, filed on Feb. 22, 2001.

(51) Int. Cl.
    *G06Q 40/00* (2006.01)
(52) U.S. Cl. .............. 705/38; 705/35; 705/39
(58) Field of Classification Search .......... 705/35–45
    See application file for complete search history.

(56) References Cited

U.S. PATENT DOCUMENTS

| | | |
|---|---|---|
| 4,736,294 A | 4/1988 | Gill |
| 4,876,592 A | 10/1989 | Von Kohorn |
| 4,895,518 A | 1/1990 | Arnold |
| 5,034,807 A | 7/1991 | Von Kohorn |
| 5,259,766 A | 11/1993 | Sack |
| 5,262,941 A | 11/1993 | Saladin |
| 5,274,547 A | 12/1993 | Zoffel et al. |
| 5,611,052 A | 3/1997 | Dykstra |
| 5,615,408 A | 3/1997 | Johnson |
| 5,704,029 A | 12/1997 | Wright, Jr. |
| 5,732,400 A | 3/1998 | Mandler |
| 5,774,883 A | 6/1998 | Andersen |

(Continued)

FOREIGN PATENT DOCUMENTS

EP    0 869652    10/1998

(Continued)

OTHER PUBLICATIONS

"Monitoring Your Financial Score Card", by Mary Judice, dated Apr. 23, 2000, p. F.4, ProQuest search.*
How the RMA/Fair, Isaac credit-scoring model was built, dated Jun. 1995, v77n10, pp. 10-16, ProQuest search.*
E-Loan, Inc. "Once Again Gives Consumers Credit Scores for Free", PR Newswire. New York: Apr. 23, 2001, p. 1.*

(Continued)

*Primary Examiner* — Ella Colbert
*Assistant Examiner* — Hai Tran
(74) *Attorney, Agent, or Firm* — Mintz, Levin, Cohn, Ferris, Glovsky and Popeo, P.C.

(57) ABSTRACT

The invention comprises a method and apparatus for explaining credit scores, for example in connection with a credit score explanation service, in which consumers can identify the sources of information used to establish their credit score, supply their credit report and credit score information in connection with their application for credit-related products and services, such as loans, and determine the effect on their credit score and cost for credit-related products and services based upon various hypothetical changes in their credit behavior.

12 Claims, 15 Drawing Sheets

U.S. PATENT DOCUMENTS

| | | | |
|---|---|---|---|
| 5,793,972 | A | 8/1998 | Shane |
| 5,875,236 | A | 2/1999 | Jankowitz |
| 5,878,403 | A | 3/1999 | DeFrancesco |
| 5,930,764 | A | 7/1999 | Melchione |
| 5,930,776 | A | 7/1999 | Dykstra |
| 5,940,812 | A | 8/1999 | Tengel |
| 5,950,172 | A | 9/1999 | Klingman |
| 5,966,695 | A | 10/1999 | Melchione |
| 5,995,947 | A | 11/1999 | Fraser |
| 6,029,149 | A | 2/2000 | Dykstra |
| 6,064,987 | A | 5/2000 | Walker |
| 6,070,141 | A | 5/2000 | Houvener |
| 6,088,686 | A | 7/2000 | Walker |
| 6,094,643 | A | 7/2000 | Anderson |
| 6,105,007 | A | 8/2000 | Norris |
| 6,115,690 | A | 9/2000 | Wong |
| 6,119,103 | A | 9/2000 | Basch |
| 6,128,599 | A | 10/2000 | Walker |
| 6,128,603 | A | 10/2000 | Dent |
| 6,324,524 | B1 | 11/2001 | Lent et al. ............ 705/38 |
| 6,405,173 | B1 * | 6/2002 | Honarvar et al. ........ 705/7 |
| 6,405,181 | B2 * | 6/2002 | Lent et al. ............ 705/38 |
| 6,513,018 | B1 * | 1/2003 | Culhane ............. 705/35 |
| 6,567,791 | B2 * | 5/2003 | Lent et al. ............ 705/38 |
| 7,143,063 | B2 | 11/2006 | Lent |
| 7,249,076 | B1 * | 7/2007 | Pendleton et al. ....... 705/35 |
| 2002/0077964 | A1 | 6/2002 | Brody |

FOREIGN PATENT DOCUMENTS

| | | |
|---|---|---|
| EP | 0 913789 | 5/1999 |
| WO | WO-00/26833 A1 | 5/2000 |
| WO | WO 01/57720 | 8/2001 |

OTHER PUBLICATIONS

"You Can Fix Your Credit No Matter How Bad It Is", Laura Castaneda 1997, San Francisco Chronicle, St. Louis Post Dispatch, St. Louis, Mo., date Jul. 4, 1997, p. 05.C.*

*Data Validation Tips and Techniques*—zdnet.com Sep. 1, 1999.

*Powerforms: Declarative Client-Side Form Field Validation,* ISSN 1386-145X, Dec. 2000.

www.halhems.com/index.cfm?fuseaction=newsletters.Oct. 1999.

Singletary, M. "Score One for Open Credit Ratings." The Washington Post, Washington DC, Jun. 18, 2000, 3 pages.

Stanton, T. H. "Credit Scoring and Loan Scoring as Tools for Improved Management of Federal Credit Programs." Financier, Philadelphia, Summer 1999, vol. 6, 15 pages.

How Much Does a Low FICO Score Cost? Jul. 14, 2000, htto://ficobuilder.com/kbsrch.htm, 2 pages.

Announcing TrueProfiler, Nov. 20, 2000, http://www.truecredit.com/index.asp, 2 pages.

TrueProfiler add on to any credit report for only $3.95, Nov. 20, 2000, https://www.truecredit.com/credit/TrueProfilerSample.asp, 10 pages.

FICO Guide Service, Nov. 20, 2000, https://www.ficoguide.com/sample_report.cfm, 10 pages.

Your ficobuilder.com order is here! Jul. 3, 2000, 46 pages.

Overview, Aug. 7, 2000, file:///Windy%20Hillo/Desktop%20Folder/Fair%20Isacc%20explainer%20call%20Irene/CreditXpert%AA, 12 pages.

Deborah McNaughton, "All About Credit", Dearborn Trade Publishing, Apr. 1, 1999.

* cited by examiner

FIG. 5A myFICO - Your Source For Credit Scoring myFICO℠  home   FAQ   site map   privacy policy   terms of use   about us   contact us

FairIsaac

The Score Lenders Use

Sample Score Power Report — 50

Note: This sample report is only an illustration of the type of information provided when Score Power is purchased. The information in the sample Score Power Report and the results in the sample FICO Score Simulator are fictitious and do not reflect your personal situation. You must purchase Score Power to obtain the FICO score and analysis that pertain to your personal situation.

Your Score Power FICO® score — 51    Your Score Power™ credit history from Equifax — 52    FICO® Score Simulator — 53

- Summary
- Top Positive Factors
- Top Negative Factors
- How Lenders See You

- Personal Information
- Accounts Summary
- Negative Items
- Inquiries

- FICO Score Simulator
- FAQ

Go to: [ Pick account ▼ ]

🖨 Printable version

Score POWER™

FICO® SCORE 707
FOR JOHN SMITH
ON OCTOBER 5, 2001 — 55

720  Your FICO® Score at *EQUIFAX*

···· Credit record source: Equifax — 54

• Your BEACON℠ FICO score of 707 summarizes the information on your Equifax credit report as of October 5, 2001. FICO scores range between 300 and 850.
• Higher scores are considered better scores. That is, the higher your score, the more favorably lenders look upon you as a credit risk.
• Your score is slightly below the average score of U.S. consumers, though most lenders consider this a good score.

*INSERT CLIPART HERE*

Score Power™ View Sample
FICO® Score Simulator View Sample
Credit Central
How Scoring Works
Interpreting scores
Calculators
Member Services
Partner Programs

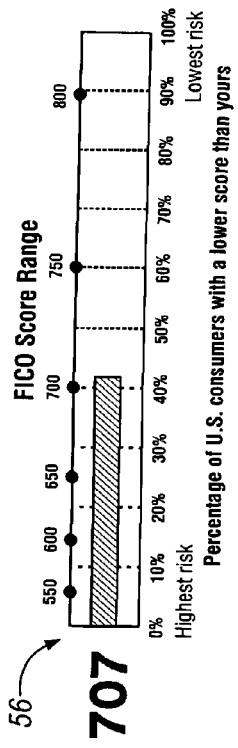

707

FICO Score Range

0%  10%  20%  30%  40%  50%  60%  70%  80%  90%  100%
Highest risk                                    Lowest risk Percentage of U.S. consumers with a lower score than yours

The Bottom Line: What a FICO score of 707 means to you

More than 75% of the applications for credit in the U.S. last year were decided with the help of a FICO score. Lenders consider many factors in addition to your credit score when making credit decisions. Looking solely at your FICO score, however, most lenders would consider this score as an acceptable risk.

This means:

- You have a good score and a wide array of loans and credit products will likely be available to you.
- Most lenders will consider offering you very competitive rates and terms on loan products.
- Some lenders may require additional information, such as income or time at job, to help them more accurately set the terms of your loan product.

It is important to understand that different lenders set their own policies and tolerance for risk when making credit decisions, so there is no single "cutoff score" used by all lenders.

Summary of factors affecting your score

The FICO score is calculated based on the information contained in your Equifax credit history. While knowing your actual score is a good start, understanding the key factors affecting your FICO score is much more important. These factors will provide you direction on how you can increase or maintain your FICO score over time.

 Positive Factors

Here are the top factors that reflect your good credit behavior (they are listed in priority of impact on your score):

- Your credit file shows no evidence of seriously late credit payment     More information
- You demonstrate a relatively long credit history     More information

 Positive Factors

Here are the top factors where you have the most opportunity to take action, in order to increase your FICO score over time (they are listed in priority of impact on your score):

- You have missed payments reported on your credit account     More information
- The amount owed on your non-mortgage related accounts is too high     More information

In today's market many consumers take advantage of credit offers with lower interest rates and transfer balances between accounts in order to benefit from these lower rates. The impact of this strategy on your FICO score will vary depending on your current profile.

As a result of opening a new account, a new credit account (and possible inquiry) will be posted on your credit report - this can impact your score. In addition, the information on your revolving accounts will change, which could raise or lower your score, depending on your profile.

Bottom Line: The effects of credit card balance transfers are unique for each individual. This is because there are many factors to consider, including the terms of the transfer as well as other relevant information on your credit profile.

◀ *Try Another Simulation*

Local Average Loan Rates

This is some greeked text that discusses how learning your score and taking action can save you money. This is some greeked text that discusses how learning your score and taking action can save you money.

Scorepower Marketing info/buttton

Find average lending rates in your state. [Alabama ▼] [Go!]

80 →

Local Home Lending Rates by FICO Score

| Home Mortgage Options | 300-619 | 620-659 | 660-719 | 720-850 |
|---|---|---|---|---|
| 30-yr fixed conforming | 6.41% | 6.99% | 8.63% | 11.03% |
| 15-yr fixed conforming | 6.41% | 7.00% | 8.64% | 11.04% |
| 30-yr fixed non-conforming | 6.43% | 7.01% | 8.65% | 11.09% |
| 15-yr fixed non-conforming | 7.06% | 7.66% | 9.37% | 11.54% |
| 5-1 ARM conforming | 7.48% | 8.08% | 9.66% | 11.42% |
| 5-1 ARM non-conforming | 6.71% | 7.33% | 9.05% | 11.41% |
| Home Equity Options | | | | |
| Home equity loan | 6.71% | 7.33% | 9.05% | 11.41% |
| Home equity line of credit | 6.73% | 7.33% | 9.06% | 11.44% |

Print | About These Rates

81a → ( Determine my FICO Score )  Interset rates updated on xx/xx/2002

82 →

Local Auto Lending Rates by FICO Score

| Auto Loan Options | 300-674 | 675-689 | 690-719 | 720-850 |
|---|---|---|---|---|
| 36-month new autos | 7.48% | 8.08% | 9.66% | 11.42% |
| 48-month new autos | 6.71% | 7.33% | 9.05% | 11.41% |
| 60-month new autos | 6.73% | 7.33% | 9.06% | 11.44% |
| 48-month used autos | 6.71% | 7.33% | 9.05% | 11.41% |

Print | About These Rates

81b → ( Determine my FICO Score )  Interest rates updated on xx/xx/2002

*FIG. 8*

Loan Savings Calculator Based on FICO Score Ranges  ← 90

91 — Loan Type: [Home - 30 year fixed conforming ▼]
92 — Loan Principle: [$100,000]
93 — Your Location: [National ▼]

|  | Current (98) | Target (99) |
|---|---|---|
| 94 — FICO Score Range: | [300-619 ▼] | [720-850 ▼] |
| 95 — Average Interest Rate: | 11% | 7% |
| 96 — Monthly Payment: | $500 | $400 |
| 97 — Total Interest Paid Over Life of Loan: | $1,000,000 | $500,000 |
| 84 — Savings on Monthly Payments: | $100 | |
| 85 — Savings Over Life of Loan: | $500,000 | |

METHOD AND APPARATUS FOR EXPLAINING CREDIT SCORES

RELATION TO OTHER PATENT APPLICATIONS

This application is a continuation-in-part of A. Flint, D. Lear, C. St. John, Method and Apparatus for Explaining Credit Scores, U.S. patent application Ser. No. 09/790,453 (Feb. 22, 2001).

BACKGROUND OF THE INVENTION

1. Technical Field

The invention relates to credit scoring. More particularly, the invention relates to a method and apparatus for explaining credit scores.

2. Description of the Prior Art

Recent events have made it desirable for developers of credit scoring algorithms, such as Fair, Isaac and Company, Inc. of San Rafael, Calif. (FICO) to move toward offering a service to deliver credit bureau risk scores and explanations directly to consumers and lenders. Consumer advocacy groups and credit counseling organizations have provided positive feedback on these announced intentions. Additionally, credit scoring developers clients, i.e. the credit grantors themselves, have expressed their understanding of the need to pursue this undertaking. Most organizations are comfortable that each credit scoring developer, such as Fair, Isaac, is the only entity in the market that can actively take on the role of credit score delivery and explanation Note that some clients participate in delivery of scores and explanations through integration with their web sites.

A comprehensive score delivery and explanation service should include all of the following pieces:

Credit scores delivered to consumers.

The primary reason codes that have influenced the score.

Representation of the consumer's credit bureau report from which the score was calculated to allow them to cross-reference the information with his/her actual credit report.

A personalized score explanation that describes to that consumer, in plain language, how their individual score was derived. This explanation service can be further enhanced using data elements present in the consumer's credit report.

A. Flint, D. Lear, C. St. John, Method and Apparatus for Explaining Credit Scores, U.S. patent application Ser. No. 09/790,453 (Feb. 2, 2001) describe a Web site containing an array of informative resources including for-pay services and extranet functions to serve consumers and traditional players in the financial services industry, including financial counselors, mortgage brokers, direct lenders, large national credit issuers, and third-party credit report re-sellers, plus information seekers such as the press, consumer groups, and government agencies. A primary focus of the Flint et al. invention is to educate consumers, consumer groups, and the consumer press by offering them access to the exceptionally high-quality information, both general and personal, about the practices of collection, storing, reporting, and evaluating consumer credit data.

While the Flint et al. invention provides an excellent framework for a consumer credit score explanation service, it would be advantageous to provide an enhanced method and apparatus for explaining credit scores, for example in connection with a credit score explanation service, in which consumers could identify the sources of information used to establish their credit score, supply their credit report and credit score information in connection with their application for credit-related products and services, such as loans, and determine the effect on their credit score and cost for credit-related products and services based upon various hypothetical changes in their credit behavior.

SUMMARY OF THE INVENTION

The invention comprises a method and apparatus for explaining credit scores, for example in connection with a credit score explanation service, in which consumers can identify the sources of information used to establish their credit score, supply their credit report and credit score information in connection with their application for credit-related products and services, such as loans, and determine the effect on their credit score and cost for credit-related products and services based upon various hypothetical changes in their credit behavior.

The preferred embodiment of the invention provides a Web site containing an array of informative resources including for-pay services and extranet functions to serve consumers and traditional players in the financial services industry, including financial counselors, mortgage brokers, direct lenders, large national credit issuers, and third-party credit report re-sellers, plus information seekers such as the press, consumer groups, and government agencies. A primary focus is to educate consumers, consumer groups, and the consumer press by offering them access to the exceptionally high-quality information, both general and personal, about the practices of collection, storing, reporting, and evaluating consumer credit data.

The invention also provides enhancements to an on-line consumer credit score explanation service, such as the linking of consumer credit reports and scoring information to the vendors of consumer credit products and services and/or information sources via the consumer credit score explanation service; linking the vendors of consumer credit products and services and/or information services to the consumer credit score explanation service; the provision of various offers and/or information in connection with credit-related goods and services and a mechanism by which consumers may opt-in to receive such offers when they are using the consumer credit score explanation service; the processing of consumer scores inside a decision engine; the provision of various offers from vendors of credit-related products and services, conditioned upon thresholds established by such vendors, in which interested consumers are linked back, e.g. in a new browser window, to the vendor's site where their request for credit-related products or services (or whatever the offer) is processed by that vendor. Alternative embodiments of the invention may also process the application for the lender using software provided by the score explanation service

BRIEF DESCRIPTION OF THE DRAWINGS

FIG. 5 is a display showing sample consumer credit score report according to the invention;

FIG. 8 is a display showing a sample lending rate table based upon hypothetical consumer credit scores according to the invention; and FIG. 9 is a display showing a calculator for determining consumer credit cost based upon hypothetical consumer credit scores according to the invention.

DETAILED DESCRIPTION OF THE INVENTION

The presently preferred embodiment of the invention may be implemented in a system, such as that taught by A. Flint, D. Lear, C. St. John, Method and Apparatus for Explaining Credit Scores, U.S. patent application Ser. No. 09/790,453 (Feb. 2, 2001), which describes a Web site containing an array of informative resources including for-pay services and extranet functions to serve consumers and traditional players in the financial services industry, including financial counselors, mortgage brokers, direct lenders, large national credit issuers, and third-party credit report re-sellers, plus information seekers such as the press, consumer groups, and government agencies.

Figure 1:
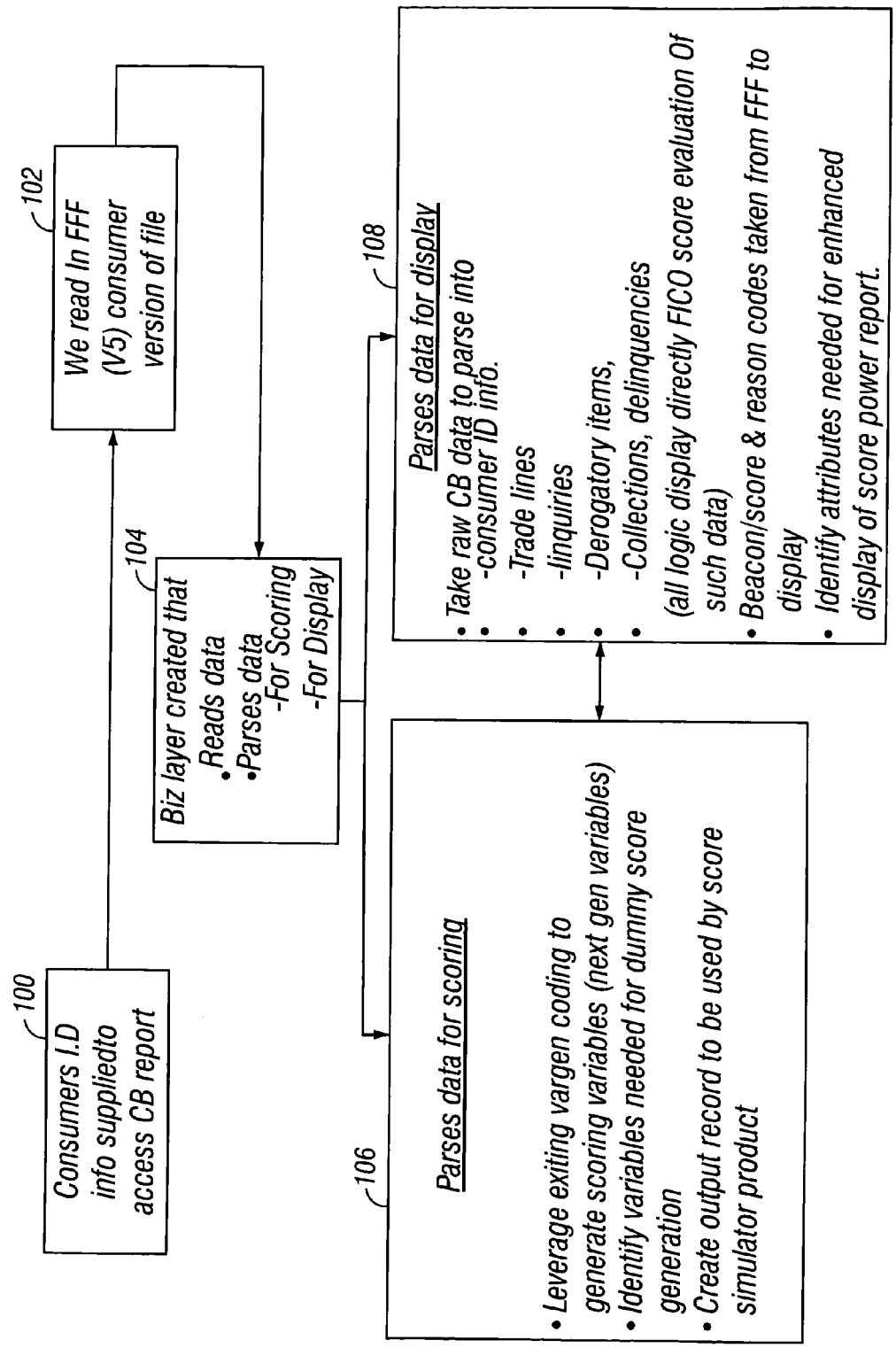
FIG. 1 is a flow diagram showing the accessing of credit bureau data via an consumer credit score explanation service Web site according to the invention.

FIG. 1 is a flow diagram showing the accessing of credit bureau data via an consumer credit score explanation service Web site according to the invention. In such system, a consumer visits an on-line consumer credit score explanation service, such as www.myFICO.com, and clicks a Buy Now button. The consumer enters personal identification information, such as his name, address, SSN, phone, and email address 100, and creates a Login ID and Password which is used to access a credit bureau report for the consumer. In some embodiments of the invention, the consumer also answers a secret question that is used later if the consumer forgets the password or login id. Those skilled in the art will appreciate that other information may be requested and provided or that consumer log in may be accomplished by a wallet service or other such service.

In some embodiments of the invention (discussed below), the consumer also selects "yes/no" to one or more Opt In questions. In this later embodiment, the consumer clicks yes to "I Agree" with regard to privacy policy, terms of use, and user consent, and enters appropriate credit card information. In response, the consumer's credit report is retrieved by a credit reporting agency, such as Equifax. If the consumer's credit report is successfully located, the consumer is presented with questions about their information on his credit report that is used to authenticate his identity. This is performed, for example, by the credit reporting agency but is presented to the consumer via the consumer credit score reporting service, e.g. myFICO.

If consumer passes authentication, the system can now view the consumer's order. The consumer's credit report is read into the consumer credit score explanation service computers 102 and it is immediately parsed 104 from its native format into a data field specific format, such as XML segments, that is used for any of the following purposes in the presently preferred embodiment of the invention:

To create the visual representation of the credit bureau report section of the report provided to the user 108.

To be fed into a decision engine that takes the parsed information and creates a pool of credit bureau characteristics (in the preferred embodiment, about 25 characteristics are used, but more than 25 characteristics may be used) 106. These characteristics are processed to generate various metrics on the consumer's credit behavior that are used to enhance the explanation provided to the user about their credit score.

Figure 2:
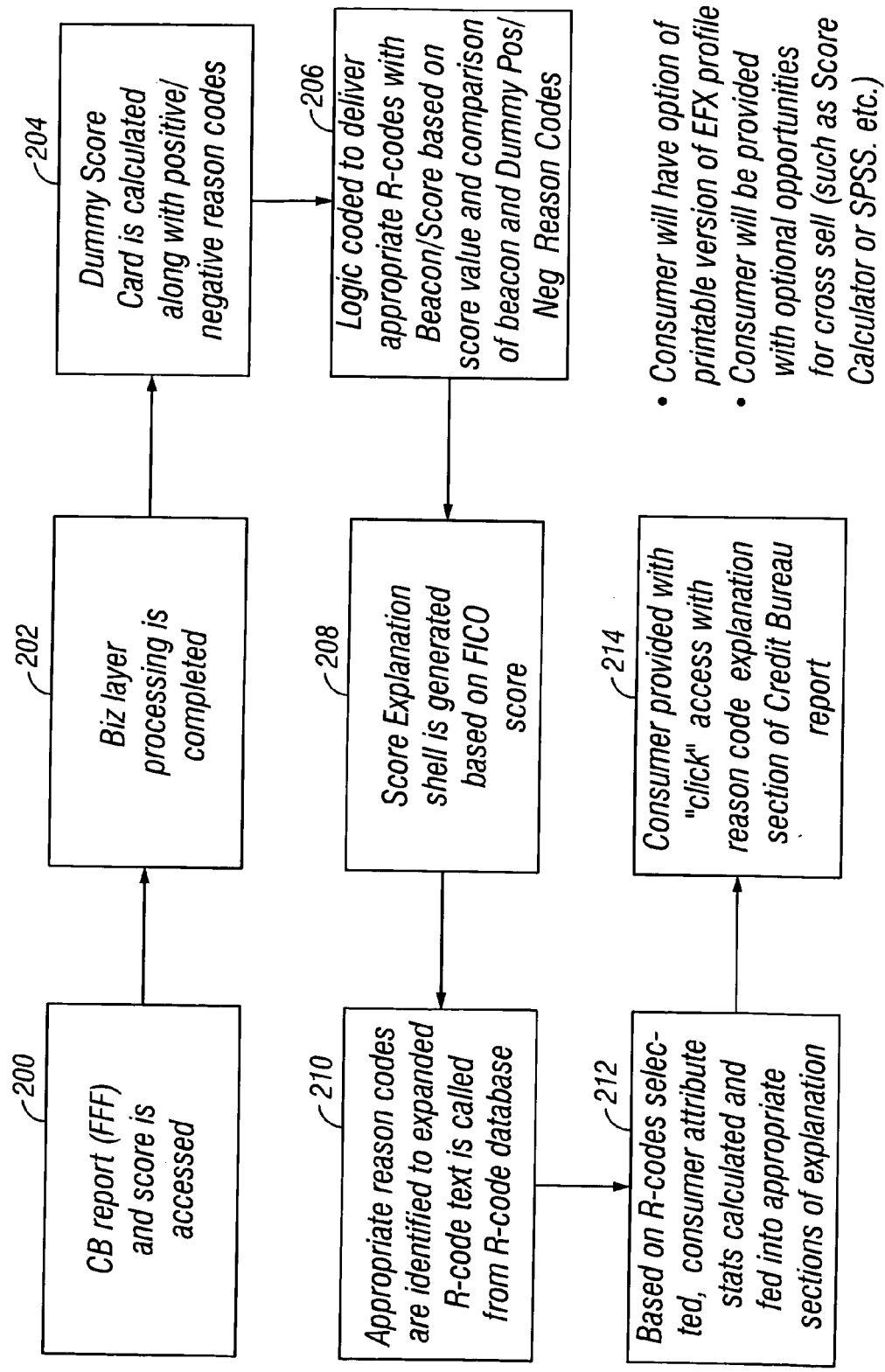
FIG. 2 is a flow diagram showing the processing of credit bureau data via an consumer credit score explanation service Web site according to the invention.

FIG. 2 is a flow diagram showing the processing of credit bureau data via a consumer credit score explanation service Web site according to the invention. Once the credit report and score are accessed 200 and processed 202, the characteristics are used to generate both positive and negative reason codes 206. A score explanation shell is created based on the credit score 208 and appropriate reason codes are identified 210. The reason codes are then selected, based upon the consumer's score, and appropriate explanation text is selected and merged in the score explanation shell for presentation to the consumer 212. The decision engine logic then displays the correct mix of positive/negative reason codes based on the consumer's real credit score 214.

The characteristics are also used in a score simulator tool (discussed below). The characteristics are used to generate a simulated credit score, i.e. a score that tries to predict the consumer's real credit score 204. When the consumer selects a particular simulation option, the decision engine takes the requested simulation, alters the characteristic to reflect that selected simulation, recalculates the simulated credit score, compares it to the real credit score, and provides the consumer with a range of the impact that simulation would have on the consumer's credit score. When the consumer clicks to perform another simulation, the characteristics are set back to their original values and the process is repeated with the different simulation request.

Figure 3A:
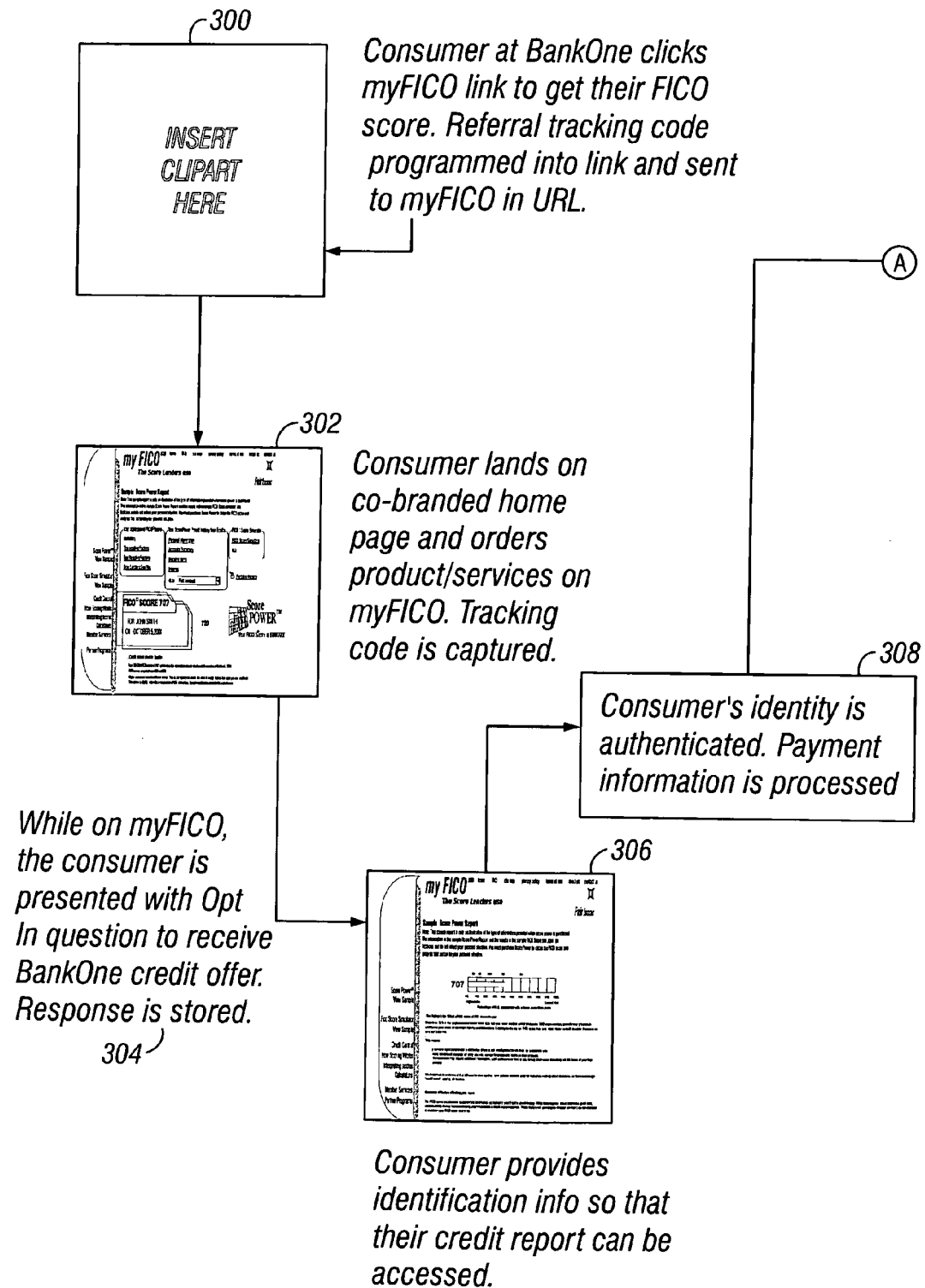
FIG. 3 is a flow diagram showing the linking of vendors of consumer credit products and services with a consumer credit score explanation service according to a preferred embodiment of the invention.
Figure 3B:
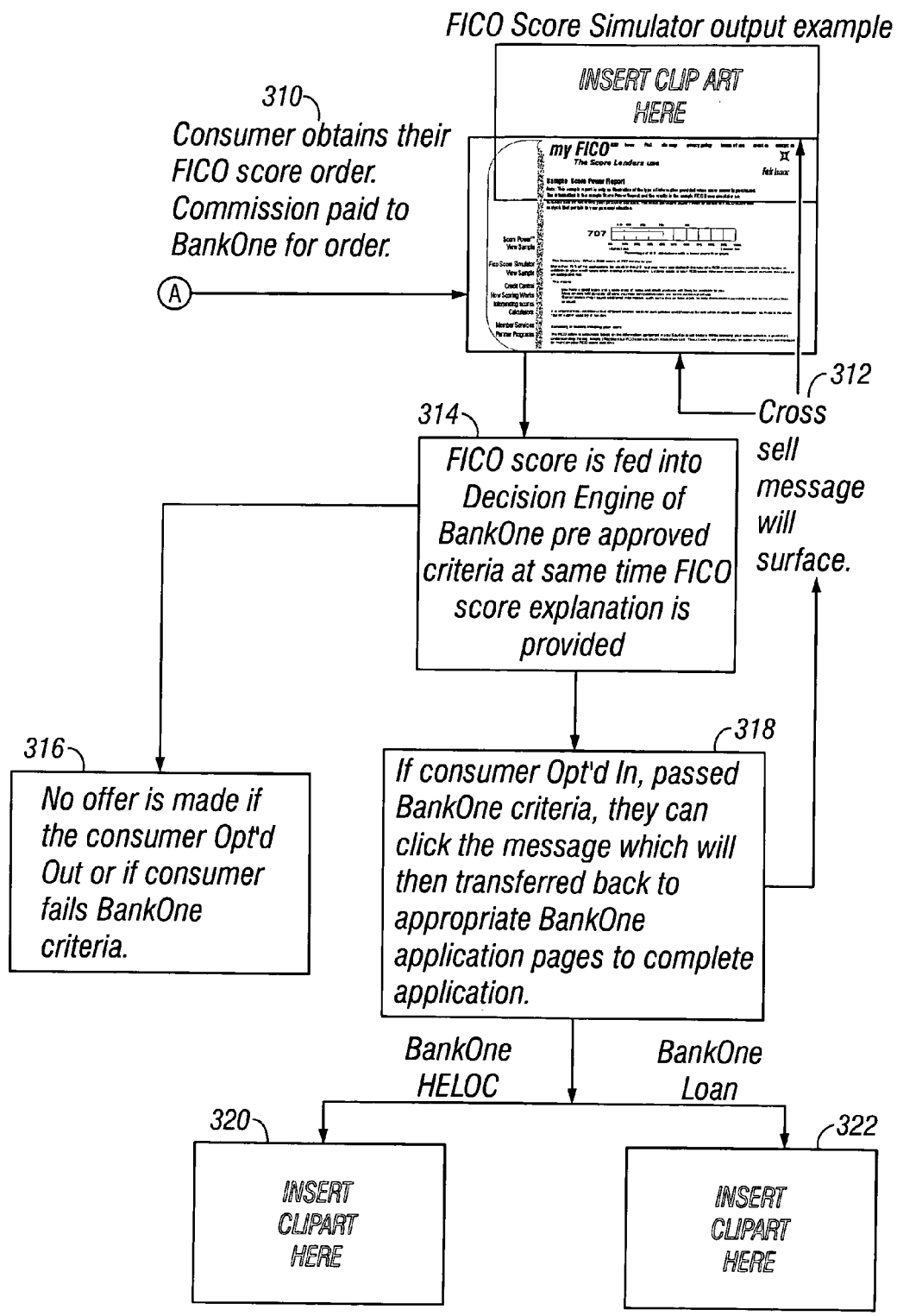

FIG. 3 is a flow diagram showing the linking of vendors of consumer credit products and services with a consumer credit score explanation service according to a preferred embodiment of the invention. In this embodiment of the invention, individual credit score explanation service users can apply their credit score to determine if they qualify for credit and receive offers from vendors of credit-related goods and services.

This embodiment of the invention enables vendors of credit-related goods and services, such as lending institutions, to identify qualified prospects and offer them specific credit products in which they have expressed an interest. This embodiment of the invention is preferably used in conjunction with a consumer credit score explanation service, such as Fair, Isaac's Score Delivery and Explanation service.

This embodiment of the invention operates as follows:

A consumer visiting the lending institution's Web site 300 links to a consumer score explanation service, e.g. myFICO.com, to purchase the score explanation service 302. During the purchase process, the consumer can choose to opt-in 304 to receive offers from the lending institution. The consumer then provides identification information 306 which allows the consumer's credit report to be accessed. The consumer's identity is authenticated and payment information for the service is processed. The consumer receives his credit score 310. The consumer's score is processed through a decision table that matches the score against criteria provided by the lending institution 314.

If the consumer did not opt-in or did not meet the lender's criteria, an offer is not made to the consumer 316. In such case, the consumer did not expect to receive an offer and, should the lender's criteria not be met by the consumer, the consumer is not placed in a position where his expectations of receiving an offer of credit are not met.

If the lender's criteria are met and the consumer opted-in, then based on instructions from the lender, different cross-sell messages can be presented to the consumer via Web site display 312 based on his credit score. If the consumer wishes to inquire more about the cross-sell offer, he is transferred to the lender's Web site 318 where the credit product is sold and provisioned. Alternative embodiments of the invention may also process the application for the lender using software provided by the score explanation service.

The same concept can be extended to the consumer's use of the score simulator (see below). Based on a consumer's choice of simulation, and his credit score, a specific cross-sell message 320, 322 appears on behalf of the lender.

This embodiment of the invention allows consumers to have credit offers from lenders displayed on their credit score report. In the presently preferred embodiment of the invention, the criterion for displaying an offer is the consumer's credit score. In other embodiments, additional or other parameters are available for use in determining which offer to display.

In the preferred embodiment, a credit offer from a lender is only displayed if the consumer has linked to the myFICO-.com site from the lender's site, proceeds to purchase a credit score report, and elects to access the credit offer. Further, a credit offer is only displayed if the user has indicated their willingness to receive such offers, i.e. opted in. A fixed area of page display space is preferably reserved on the credit score report for the lender's offer. The offer is preferably displayed as a link within the credit score report. In the presently preferred embodiment, at most one credit offer is displayed on the consumer's credit score report. The criteria for displaying an offer should not overlap with other offers, e.g. only one offer is valid for a specific score range. In other embodiments, multiple offers may be displayed.

The lender provides the data for its offers, including an offer identifier, text or graphics to be displayed, and specific criterion that must be met by the consumer, i.e. score range, before displaying each offer. Below is a sample of text that is displayed in connection with the offer of credit products by a lender.

Example Text Display

FICO score higher than X:
"Your FICO score qualifies you for a pre-approved loan from <link partner name>. Click here to visit <link partner web site URL> to apply."
FICO score In between Y and X:
"Your FICO score may qualify you for a loan from <link partner name>. Click here to visit <link partner web site URL> to apply."

If the consumer clicks on the displayed offer, he is transferred to the lender's Web site to apply for the credit (320, 322; FIG. 3).

In the presently preferred embodiment, a new browser window is opened when linking to the lender's Web site. The lender provides the URL of the lender's site to be used for each offer. An identifier for the selected offer is included in the link, as well as a unique transaction id. The system stores the identifier of the selected offer before transferring the consumer to the lender's Web site. The system accepts an additional parameter from lenders, e.g. lender's transaction id, in the initial link to the www.myfico.com Web site. The value in this parameter is returned to the lender when the user selects an offer for use in linking to the lender's Web site.

An alternative embodiment of the invention forwards the entire credit file to the lender, e.g. in an easy to work with XML version, when the link is clicked. This allows the lending institution to pre-populate a credit application easily and perform initial rules-based pre-screening of the credit application to determine if the applicant meets certain base lending criteria, e.g. age >18, applicant from states within lending footprint.

The system allows the length of time since the initial display of a report to be used as an additional criterion for offering the consumer the opportunity to obtain information about offers of credit. The opportunity is offered only if the number of days since the credit score report was first displayed is less than the specified value, assuming all other criteria for that offer are met. If this aspect of the invention is not implemented, the system only offers the consumer the opportunity on the initial display of the credit score report.

In processing a referral based upon lender criteria, as discussed above, the system first checks to see if the offer is in the valid score ranges and other non-score related criteria as well. The system then checks to see if the offer is still date valid. If the score range and/or date are valid, the system displays the offer (318; FIG. 3). If the score range and/or date are not valid, then the system does not display anything (316; FIG. 3).

The link provided to the consumer, if an offer is made, is to the lender. A database is updated showing when the consumer clicked on the offer, and which offer was clicked. Then, the selected link is retrieved from the database. The current Web page is then redirected to the lender's site with a unique ID passed to identify the consumer credit score explanation service to the lender as the source of the consumer referral, e.g. for purposes of paying a commission or referral fee.

This embodiment of the invention also provides detailed reporting to participating lenders regarding various characteristics, e.g. number, type, time of day, day of week, of the cross-sell messages displayed and reports similar characteristics regarding the hit rate on cross-sell offers pursued by the consumer that result from the consumer clicking on the link to more information or the provisioning system.

Figure 4A:
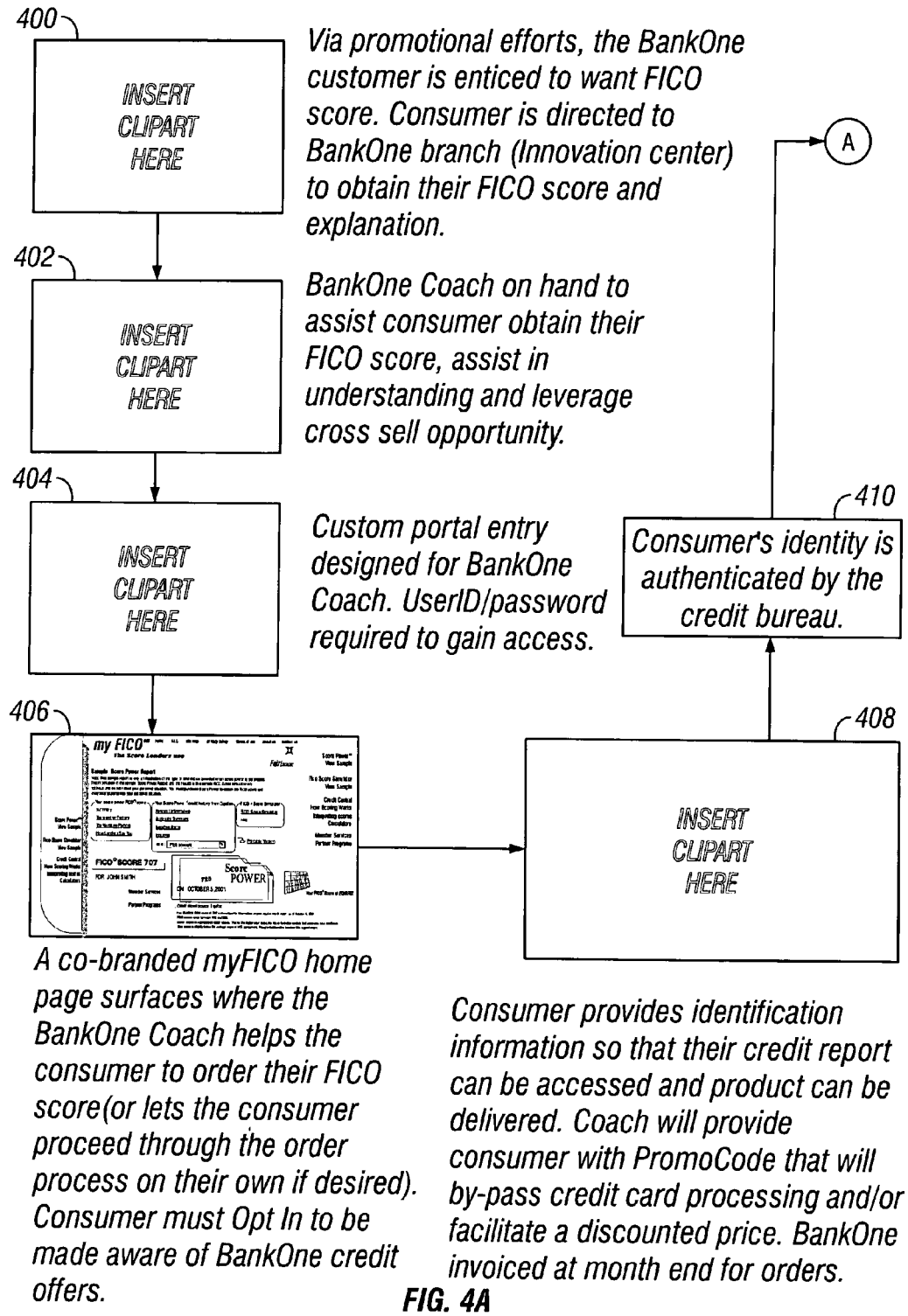
FIG. 4 is a flow diagram showing the linking of vendors of consumer credit products and services with a consumer credit score explanation service according to an alternative, equally preferred embodiment of the invention.
Figure 4B:
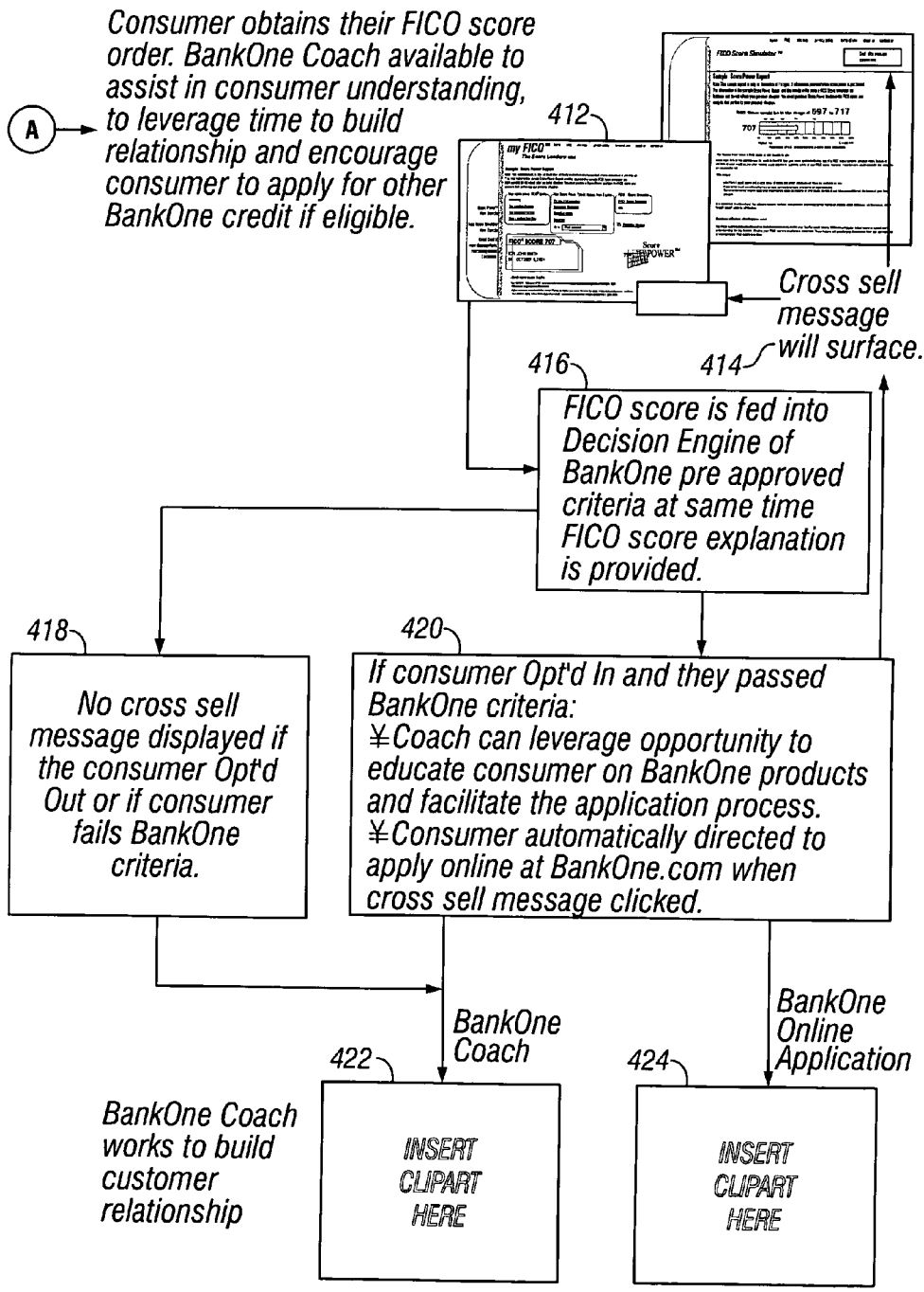

FIG. 4 is a flow diagram showing the linking of vendors of consumer credit products and services with a consumer credit score explanation service according to an alternative, equally preferred embodiment of the invention.

This embodiment of the invention operates as follows:

A consumer responding to the lending institution's promotional activities 400 inquires abut his credit score 402. The consumer is directed to a custom portal entry designed for the lender 404 that allows a consumer and/or lender agent, upon authentication, to access a co-branded score explanation service, e.g. myFICO.com, to purchase or otherwise obtain the score explanation service 406. During this process, the consumer can choose to opt-in to receive offers from the lending institution. The consumer then provides identification information 408 which allows the consumer's credit report to be accessed. The consumer's identity is authenticated 410. The consumer receives his credit score 412. The consumer's score is processed through a decision table that matches the score against criteria provided by the lending institution 416.

If the consumer did not opt-in or did not meet the lender's criteria, an offer is not made to the consumer 418. In this case, the consumer is referred back to a lender agent 422.

If the lender's criteria are met and the consumer opted-in, then based on instructions from the lender, different cross-sell messages can be presented to the consumer 414 based on his credit score. If the consumer wishes to inquire more about the cross-sell offer, he is transferred to the lender's agent or Web site 420, where the credit product is sold and provisioned. Thereafter, the consumer can complete a credit application 424.

FIG. 5 is a display showing sample consumer credit score report according to the invention. The report 50 provides information concerning the consumer's credit score 51, the consumer's credit history 52, and a credit score simulator 53. The credit score report includes the consumer's actual credit score 54 and lists the source of credit information upon which the score is based 55. The score is also represented graphically 56 in this example. The consumer is provided with an explanation of the significance of the score 57, and a summary of factors affecting the score 58, broken down into positive factors 59 and negative factors 60.

Figure 6A:
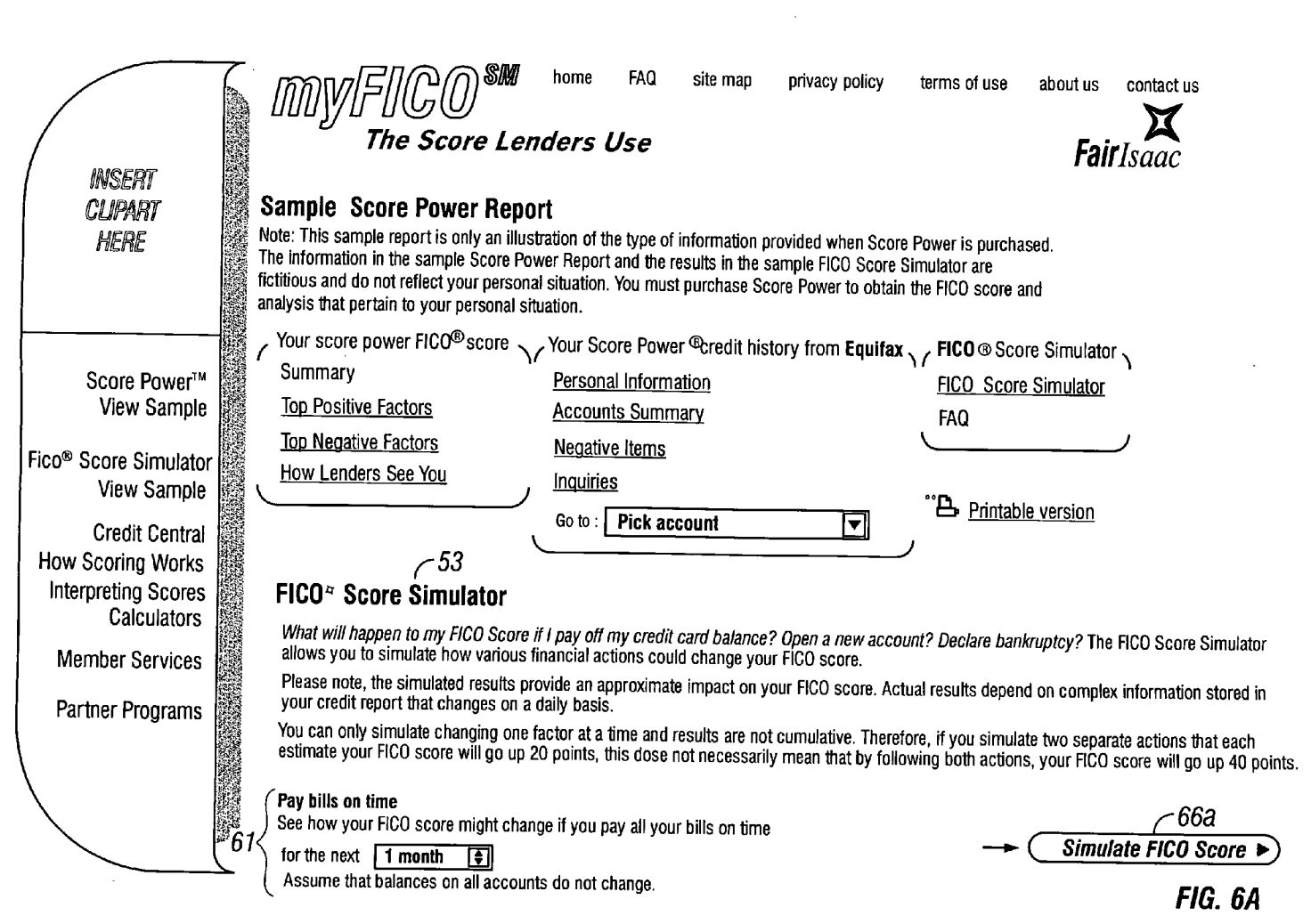
Figure 6B:
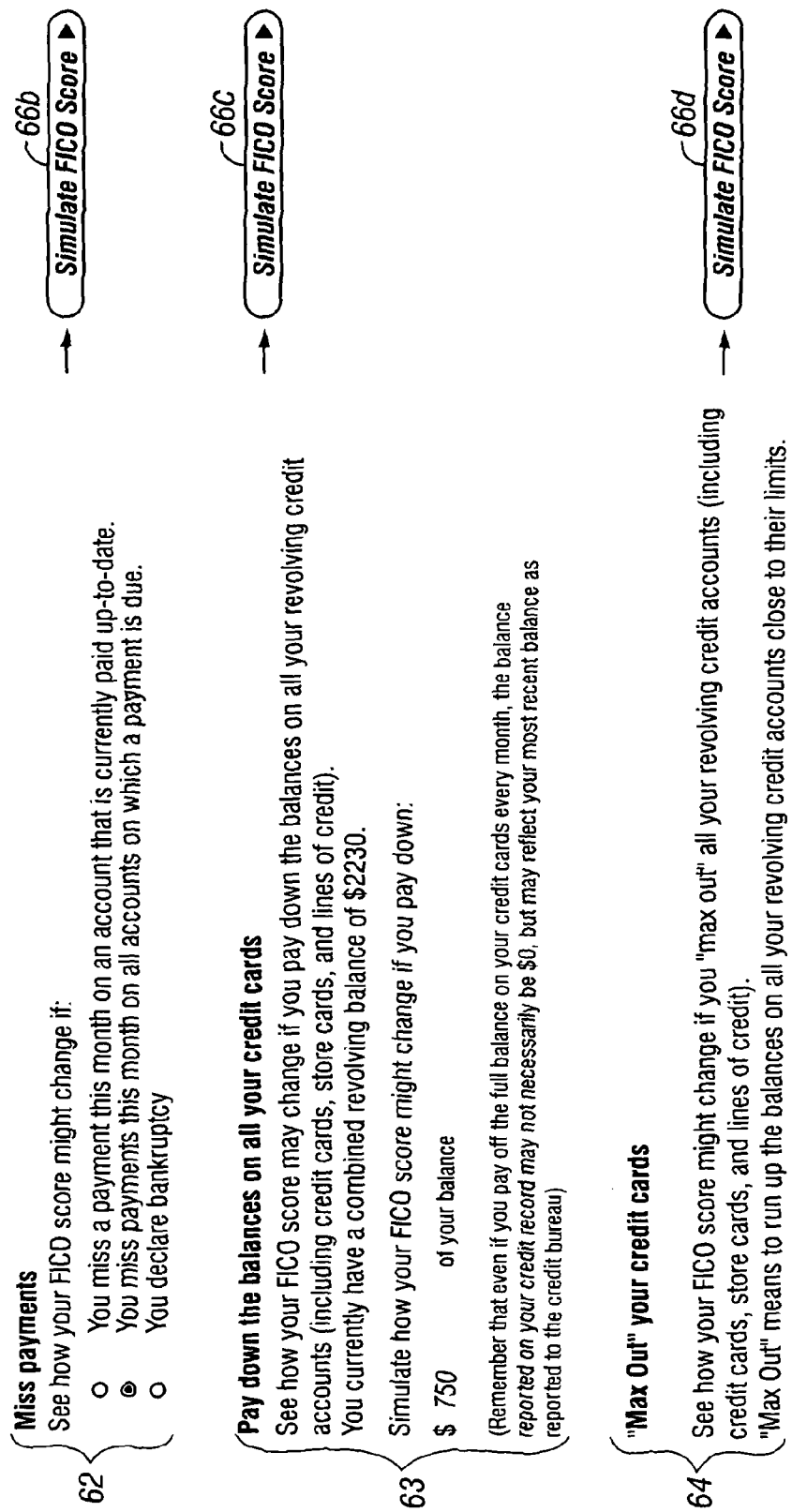
FIG. 6 is a display showing a sample consumer credit score simulator according to the invention.
Figure 6C:
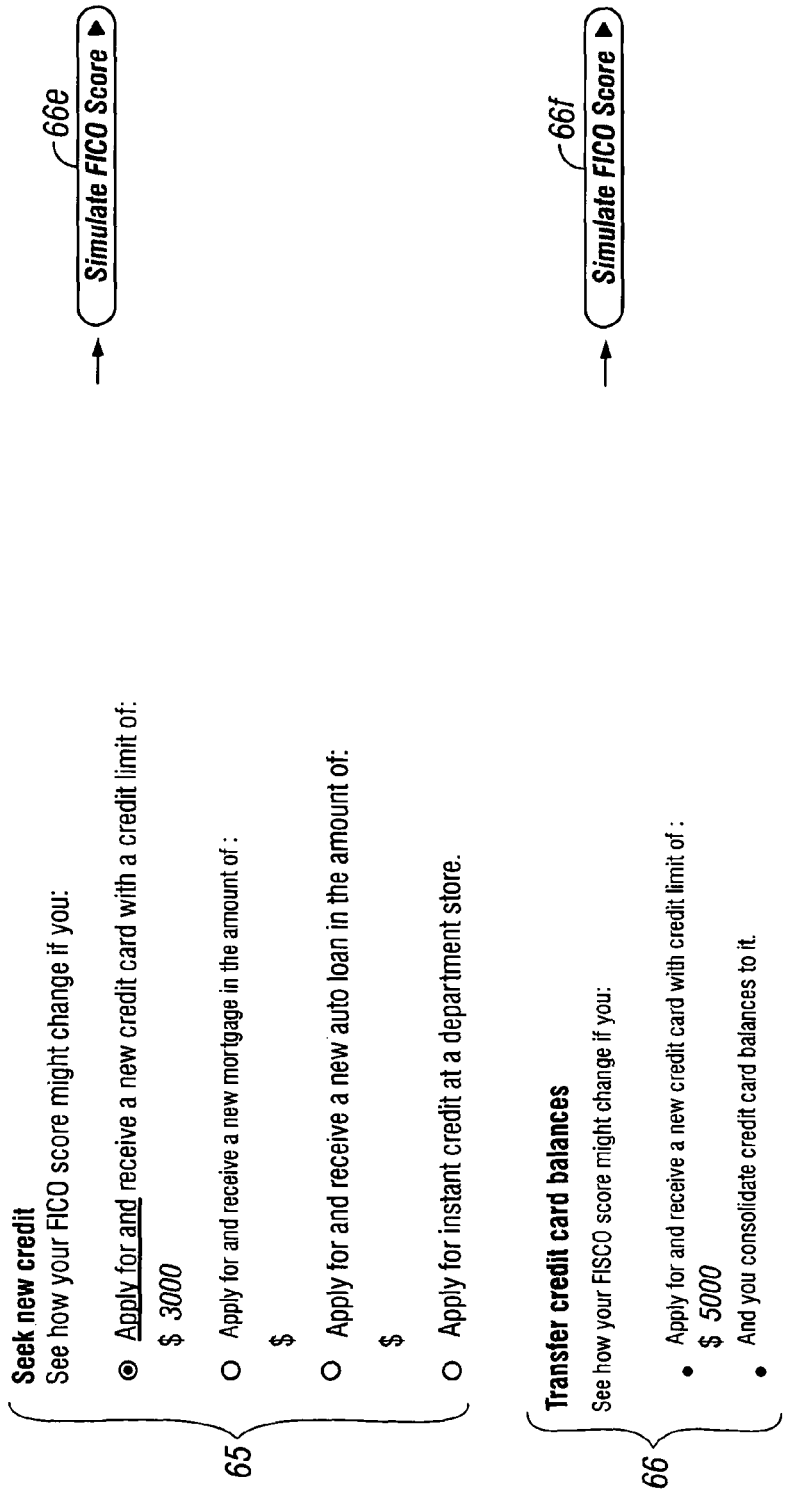

FIG. 6 is a display showing a sample consumer credit score simulator according to the invention. If the user selects the score simulator 53 (FIG. 5), a variety of hypothetical actions are provided from which the consumer may select to determine the effect of such actions on his credit score. In this example, the actions include Pays Bills On Time 61, Miss Payments 62, Pay Down the Balances on All Your Credit Cards 63, "Max Out" Your Credit Cards 64, Seek New Credit 65, and Transfer Credit Card Balances 67. The consumer simulates the effect of these actions by selecting an appropriate Simulate button 66a-66f.

Figure 7A:
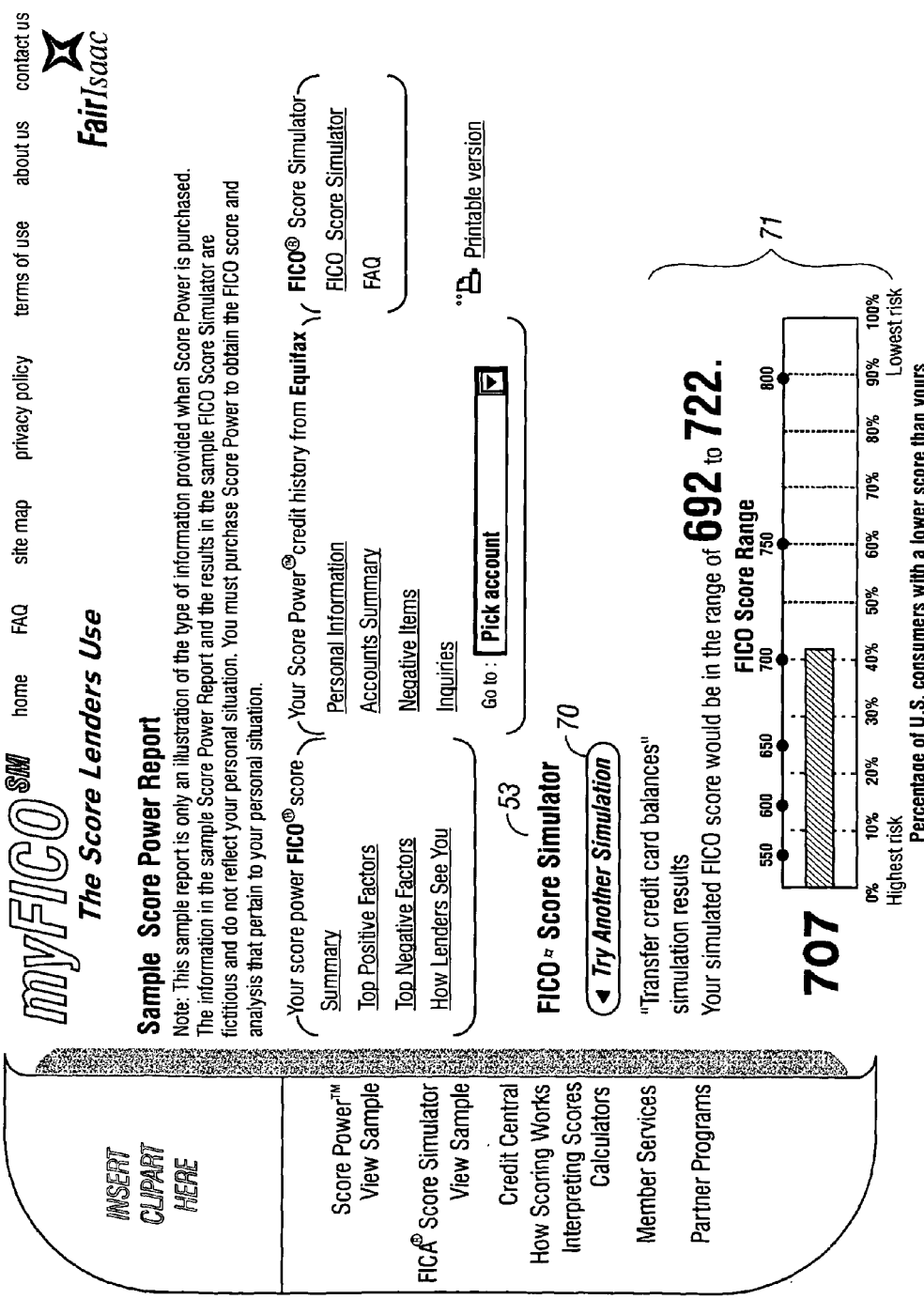
FIG. 7 is a display showing a sample consumer credit score report produced via a credit score simulator according to the invention.

FIG. 7 is a display showing a sample consumer credit score report produced via a credit score simulator according to the invention. The report 71 provides a simulated range to allow the consumer to compare the effect on his credit score of taking various actions with the consumer's current credit scores. The consumer is also offered the opportunity to Try Another Simulation 70.

Thus, this embodiment of the invention permits consumers to run a variety of "what if" scenarios on their personal credit behavior and see the impact of each scenario on their credit score. When a consumer selects a scenario, such as adding a bankruptcy filing, the consumer credit score explanation service uses the consumer's credit report to alter certain attributes in a simulated credit score algorithm. This simulated score algorithm is built for the purpose of calculating a very close approximation of the consumer's actual credit score, based on the scenario he selected. A suitable algorithm is described in A. Flint, D. Lear, C. St. John, Method and Apparatus for Explaining Credit Scores, U.S. patent application Ser. No. 09/790,453, filed Feb. 22, 2001.

Once the simulated credit score is calculated, it is compared to the consumer's real/initial credit score. The difference between the real/initial credit score and the simulated credit score is assessed for accuracy (see FIG. 2). In this embodiment, the likely impact of the selected simulation scenario on the consumer's credit score is expressed as a range of potential credit score values. In the presently preferred embodiment of the invention, simulation scenarios are mutually exclusive, i.e. consumer cannot see the impact on his credit score from more than one scenario at a time, and impacts of multiple different scenarios are not additive. The attributes are set back to their original state each time the consumer requests a new scenario and are then altered to correspond with the next scenario when run. In other embodiments, scenarios may be combined and/or impacts on credit scores can be cumulated.

In the preferred embodiment, the score simulator is only functional for those users who have purchased one-time access to the score explanation service or a product that includes the score explanation as a component, e.g. the simulator is available on the most recent score explanation report ordered that is 30 days or less old. As shown in FIG. 6, the simulator displays static introductory text that includes a description of how to use the simulator, a disclaimer about the simulator, and general information about how scores change over time.

In the preferred embodiment, a table is available on the consumer credit score explanation service database to house the data required for the score simulator process. This data is referred to herein as the generated variables. A unique identifier is forwarded to a score simulator query page in the URL which allows for a query of the generated variables record unique to that report. A second unique identifier (session_id) is evaluated to verify authentication of the user. This session_id is generated by a commerce server and stored. The preferred score simulator can be used on reports that are being reviewed within a predetermined time. Typically, only the most recently purchased report is available for simulation. Simulation of a report is also based on the report origin. A COM object is created to use the data from the generated variables table and the simulator option selected by the consumer for creation of modified generated variables.

Table "A" below lists score simulation parameters and Table "B" below lists text for a score simulator sample, static results of individual simulations.

TABLE A

| Score Simulation Parameters | | |
| --- | --- | --- |
| Simulation | Parameter | Result to be displayed |
| Pay Bills on Time | Set default to 1 month. | "Your simulated FICO score would be in the range of 707 to 727." |
| Miss Payments | Set default to "You miss payments this month on all accounts for which you have ability to pay" | . . . 582 to 632 |
| Pay Down (Revolving, Open) Balances | Set current combined revolving balance to $2,230 balance, and the pay-down input field to $750. | . . . 707 to 727 |
| Max Out Credit Cards | <No parameters to set> | . . . 637 to 687 |
| Seek New Credit | Select "Apply for and receive new credit card . . . " bullet. Set default to new credit card with $3,000 limit | . . . 697 to 717 |
| Transfer Credit Card Balances | Set new credit card limit to $5,000. | . . . 692 to 722 |

TABLE B

| Text for Score Simulator Sample, Static Results of Individual Simulations | |
| --- | --- |
| Simulation | Parameter |
| Pay Bills on Time | Paying your bills on time is a substantial factor affecting your FICO score. Generally speaking, if you have no negative items on your file, your score will remain fairly stable as you continue to pay your bills on time. If you have some history of late payments, how recent they occurred is important. The more recently they happened, the more impact they have on your score. As they age, their impact on your score will gradually lessen. This simulation shows the potential score impact if you make on-time payments on all your accounts for the next month. |

TABLE B-continued

Text for Score Simulator Sample, Static Results of Individual Simulations

| Simulation | Parameter |
|---|---|
| | Bottom Line: Paying your bills on time every month will positively affect your FICO score over time. |
| Miss Payments | FICO scores evaluate late payment information in a variety of ways, including the frequency of missed payments, the recency of the missed payments, and the severity of delinquency (how late the payment is).<br>In this simulation, the impact on your score of missing a payment will depend on your current status and the level of the delinquency. For example, the impact will be more substantial if you miss a payment this month, and you currently have spotless or relatively clean credit report. There will be less impact on the score if you currently have multiple negative items on your credit report.<br>Bottom Line: Paying your bills on time every month will positively affect your FICO score over time. |
| Pay Down Balances | How you manage your revolving accounts (credit cards, department store credit cards, revolving lines of credit) is heavily weighted in the FICO score. FICO scores evaluate your revolving accounts in a variety of ways, including comparing your balance to your available credit, as well as looking at the number of accounts with a balance. Here's a general rule to remember: consistently carrying lower balances on your revolving trade lines will generate positive points for your score. (Remember, even if you pay your credit cards in full each month, the balance shown on your credit report may not be $0. Instead, it will reflect your account balance at the time your lender supplied the update to the credit reporting agency.)<br>Bottom Line: Managing your revolving credit responsibly will positively affect your FICO score over time. |
| Max Out Credit Cards | Carrying extremely high balances on all of your revolving accounts makes you look "maxed out" on your available credit. It is often considered a high-risk trait by lenders and the FICO score.<br>In this simulation, the impact to your FICO score will depend on how high your current balances are on your revolving accounts. If you already carry high balances, the impact will probably be minimal. The impact will be more noticeable if you currently have a low or medium balance. (Remember, even if you pay your credit cards in full each month, the balance shown on your credit report may not be $0. Instead, it will reflect your account balance at the time your lender supplied the update to the credit reporting agency.)<br>Bottom Line: Carrying very high balances on all of your revolving accounts will have a negative impact on your FICO score. |
| Seek New Credit | Consumers seeking and obtaining new credit are considered more risky when compared to consumers who don't. The impact on your FICO score will vary depending on your current credit profile. The score takes into consideration the level of your existing credit history (recently opened files vs. more mature files for example), the amount of recently opened credit you currently have on file and other factors.<br>Bottom Line: Only apply for credit that you really need. The sudden ramp up of new credit in a short period of time can have a more substantial impact on your score. |
| Transfer Credit Card Balances | In today's market, many consumers will take advantage of credit offers with lower interest rates and will transfer balances between accounts in order to benefit from these lower rates. The impact of this strategy on your FICO score will vary depending on your current profile. |
| | As a result of opening a new account, a new credit account (and possible inquiry) will be posted on your credit report—this can impact your score. In addition, the information on your revolving accounts will change, which could raise or lower your score, depending on your profile.<br>Bottom Line: The effects of credit card balance transfers are unique for each individual. This is because there are many factors to consider, including the terms of the transfer as well as other relevant information on your credit profile. |

The following is an example of a score simulator list of frequently asked questions with answers thereto (FAQ):

FICO Score Simulator™ FAQ:

How do I access and use the FICO Score Simulator?
Click on the FICO Score Simulator link after you purchase and receive your Score Power report. Once at the FICO Score Simulator, you can choose from a variety of simulations. Simply choose a simulation and click on the "Simulate FICO® Score" button next to each simulation. The simulator instantly estimates the impact of this action on your credit score and presents the result to you.

Why should I use the FICO Score Simulator?
The FICO Score Simulator provides an easy way for you to explore a variety of financial choices that may help increase your FICO score, as well as what actions might cause your score to decrease. This feature will allow you simulate, for example, how your score could change if you pay your bills on time or if you reduce your credit card balances. Therefore, running these simulations can help you understand what you can do to make your FICO score better and improve your overall credit health.

Who can use the FICO Score Simulator?
Anyone who purchased a Score Power report after Oct. 14, 2001 (the day we first introduced the FICO Score Simulator) may access the FICO Score Simulator on their most recently obtained Score Power report for up to 35 days after the Score Power purchase date.

Is there a charge to use the FICO Score Simulator?
No. The FICO Score Simulator is free when you order your Score Power report.

How often can I use the FICO Score Simulator?
You have unlimited access to the simulator within the same 35-day window during which you can view your most recently obtained Score Power report.

How can I simulate a situation not shown in the FICO Score Simulator?
There are six basic simulation options available at this time. These six simulations were specifically selected according to the most commonly asked questions we receive from consumers regarding their FICO scores. We will continue to evaluate opportunities to provide you with more simulation options in the future.

Are the changes in the score cumulative? In other words, can I add the 10 points I obtained from the first simulation to the 20 points I obtained from another simulation, and assume that my score will increase by 30 points if I make both changes?

No. Each simulation result helps you understand how that specific action could affect your credit rating. You can't assume that all the simulations you run can be "summed" to provide a total change in score. The actual FICO score calculations are much more complex, evaluating the specific credit information in isolation, as well as how that information interrelates with other data on your credit report.

Can I expect the same change to my real FICO score if I take the actions that I used in the FICO Score Simulator?

We cannot guarantee that you will see the exact same results, however, the general trends would most likely hold true—or example, whether your score will increase, decrease or remain fairly stable. The purpose of the simulation is to provide you with an approximate indication of how an action you take today could possibly affect your future credit rating. To do this, we have to assume that the other parts of your credit report are "static" or don't change. In reality, information on your credit report is constantly changing, as new information is reported on your credit obligations or captured through the credit bureau data collection processes.

Do FICO scores change that much over time?

Research indicates that, for the most part, FICO scores are pretty stable from one month to the next, however changes in your credit behavior can significantly impact your FICO score over time. The degree of change in score is driven by a variety of factors such as:

Your current credit profile. How you have managed your credit to date will affect how a particular action may impact your score. For example, new information on a credit report, such as opening a new credit account, is more likely to have a larger impact on a consumer with limited credit history compared to a consumer with a very full credit history.

The change being reported. The "degree" of change being reported will have an impact. For example, if someone who usually pays bills on-time continues to do so, while a very positive action, then there will likely be only a small impact on the score one month later. On the other hand, if this same person files a bankruptcy or misses a payment, then there will most likely be a substantial impact on the score one month later.

How quickly information is updated. Remember, there is sometimes a time lag between when you perform an action (like paying off your credit balance in full) and when it is reported by the creditor to the credit bureau.

Still, small changes in score can be important for some consumers who want to obtain a certain FICO score level or who are striving to reach a certain lender's FICO score "cutoff" (the point above which a lender would accept a new application for credit, but below which, the credit application would be denied).

FIG. 8 is a display showing a sample lending rate table based upon hypothetical consumer credit scores according to the invention. This embodiment of the invention provides consumers with tables 80, 82 average APRs by credit score range for various auto and mortgage/home equity line of credit loans. The interest rate information is updated on a daily basis. This aspect of the invention enables consumer to learn approximately for what interest rates they might qualify, based on their individual credit scores. In this example, the consumer is provided with a button 81a, 81b that allows the consumer to have a determination made of his credit score.

FIG. 9 is a display showing a calculator for determining consumer credit cost based upon hypothetical consumer credit scores according to the invention. This embodiment of the invention comprises a loan savings calculator 90 that enables consumers to learn the potential dollar savings they could realize over time from an improved credit score. The calculator generates both monthly payment 84 and lifetime loan savings 85, as well as total interest paid over the life of the loan 97, based upon such factors as loan type 91, loan principle 92, location 93, average interest rate 95, and monthly payment 96. Key to this embodiment of the invention is the use of credit scores 94, including a current credit score 98 and a target credit score 99.

This embodiment of the invention provides consumers with the expected interest rate in a credit score range. In other embodiments of the invention, there is both a nation interest rate average and all state interest rate averages available by specific loan type, e.g. new car, home equity, credit card etc.

Although the invention is described herein with reference to the preferred embodiment, one skilled in the art will readily appreciate that other applications may be substituted for those set forth herein without departing from the spirit and scope of the present invention.

For example, other embodiments of the invention include considering other data sources in a decision process with regard to the provision of offers discussed above, such as data elements from a consumer's credit report, other data sources (such as Donnelly demographic data), and consumer provided preference information. When sending the consumer back to a vendor of credit-related goods or services, for example with regard to an offer, one embodiment of the invention uses XML or other techniques to automatically populate the consumer's name/address information and other data into the vendor's application form.

The consumer credit score may be based on such scoring metrics as the FICO Industry Option Scores, NextGen FICO scores, other Fair, Isaac bureau-based scores, custom solutions developed for clients or base FICO scores.

In other embodiments of the invention, the consumer credit score explanation service actually processes a consumer's application for credit on behalf of the consumer and then sends a completed/approved consumer application to a vendor of credit-related goods and/or services.

Factors considered in such processing can also include a customer reputation score/metric, where the consumer's credit score can become a consumer reputation score for online bidding/purchasing. For example, users on eBay buy and sell various goods. How much does the buyer really know about the seller and vice versa? With a reputation score being available, both the buyer and seller have more information on the other party to feel more confident about the transaction they are going to make. All eBay users could get an updated reputation score when they desire (they may have to pay for it) and it is up to the buyer/seller to determine how current that score should be.

Another embodiment of the invention contemplates a multi-, e.g. three, bureau report with a credit score. In this embodiment, one of the reports includes a credit score and a credit score explanation. Additional information is provided to help the consumer understand how his credit score could be different at the other two bureaus based on differences in data Another embodiment of the invention provides a credit fixer service which, as presently comprised, is associated with the three bureau report discussed above, but which could also work with a single bureau report. This service provides the consumer with a user friendly and easy way to fix their credit reports. Currently, it is a tedious and sometimes frustrating experience to get erroneous information corrected on credit reports, especially if the error is found on all three credit bureau reports. This embodiment permits the consumer to correct errors with the click of a button, and then all three bureaus are notified at the same time to resolve this issue. An alternative credit fixer service provides a user-friendly means for consumers to close unused or old credit accounts that negatively affect their credit score.

Another embodiment of the invention comprises a multi-, e.g. three bureau report with credit scores from all three bureaus. This report provides the consumer with all three bureau reports and credit scores/explanations for all three bureau reports.

Another embodiment of the invention comprises a credit score alert service, whereby a consumer selects such parameters as, for example, when they are to be notified if their FICO score changes. For example, a consumer might want to be notified if their score changes by more than X points, if it changes to above or below a certain score, if it moves in/out of a given score range, or if company X reviews their file (for example, New Trade or INQ). The parameters would have some caps/limits in place that the consumer credit score explanation service creates.

Another embodiment of the invention provides reports that identify theft protection with insurance backing. This embodiment comprises a service that helps consumers protect their identity from being stolen. In such embodiment, a consumer receives notification when "ID Theft" related changes appear their bureau report (change in name/address, new trade opening, inq hitting file). The service also provides insurance to cover the cost of resolving any identity theft that may happen to this user if they are a customer of this service.

Another embodiment of the invention provides a credit capacity tool that helps the consumer understand how much credit capacity is available to him at a given point in time. The preferred form of this embodiment contains three basic inputs. The consumer provides income information, collateral values are provided by another vendor, i.e. home value, etc, and credit worthiness is assessed by the credit score. The consumer is then able to complete "what if's" to determine how they can improve their credit capacity, i.e. increase their credit score, increase collateral value, and/or increase capacity/income.

Another embodiment of the invention provides a credit score optimizer service. The preferred form of this embodiment contains input from the consumer's credit file and uses a specialized version of the score simulator that identifies the negative factors most influencing the score and, as output, produces recommended actions that raise the consumer's score to a maximum level within a specified period of time. The consumer may specify the time period or request multiple optimizations, based on different timeframes, in which case the specialized scoresSimulation routine re-processes the consumer data and produces timeframe specific results.

Another embodiment of the invention includes a credit monitoring/tracking service. The preferred form of this embodiment contains input from the consumer's credit file whereby the consumer is proactively notified by either a time element, e.g. once a quarter, or by other parameters, such as when their score changes by "X" factor, to come obtain an updated score explanation. The consumer's score is tracked over time in a user friendly graph, which also shows key credit related metrics with a national averages comparison.

Accordingly, the invention should only be limited by the claims included below.

The invention claimed is:
1. A method comprising:
  initializing a score simulator tool for a consumer, the score simulator tool providing a plurality of predefined actions that represent future actions that can be taken by the consumer;
  receiving, from the consumer, a selection of a future action from the plurality of predefined future actions;
  performing, based on the selection and a real credit score of the consumer, a simulation to generate a simulated credit score of the consumer, the real credit score comprising credit bureau data characterizing financial transactions associated with the consumer, the simulated credit score representing an impact of the future action on the real credit score;
  displaying the simulated credit score to the consumer, the simulated credit score representing a range of scores; and
  displaying an explanation of the impact of the selection on the real credit score to produce the simulated credit score, the explanation based on a comparison of the simulated credit score to the real credit score.

2. The method of claim 1, further comprising:
  reinitializing, based on an input from the consumer, the score simulator tool;
  receiving, from the consumer, a new selection of a future action from the plurality of predefined future actions;
  performing, based on the new selection and the real credit score, a new simulation to generate a new simulated credit score; and
  displaying the new simulated credit score and a corresponding new explanation to the consumer.

3. The method of claim 2, further comprising:
  cumulating the simulated credit score and the explanation with the new simulated credit score and the new explanation.

4. The method of claim 2, wherein the simulation and the new simulation are mutually exclusive; and
  wherein impacts of the first simulation and the second simulation are not additive.

5. The method of claim 1, wherein the range of the simulated credit score is displayed graphically.

6. The method of claim 1, wherein the explanation further comprises factors that can affect the real credit score of the person.

7. The method of claim 6, wherein the displayed explanation is generated using a consumer credit score explanation service database.

8. The method of claim 1, wherein the comparison of the simulated credit score to the real credit score comprises calculating the difference between the simulated credit score and the real credit score, and assessing the difference for accuracy.

9. The method of claim 1, further comprising:
  providing a table in the consumer credit score explanation service database for storing generated variables required for said credit score simulator;
  forwarding a unique identifier to a score simulator query page in a uniform resource locator (URL) which allows for a query of a generated variables record that is unique to the explanation; and providing a second unique session identifier to the consumer, the second unique identifier used to authenticate the consumer.

10. The method of claim 1, further comprising:
providing the consumer with a link to a credit provider, the link containing an offer from the credit provider to the consumer of one or more credit products; and
passing the explanation to the credit provider upon an acceptance of the offer by the consumer.

11. A non-transitory computer program product comprising a machine-readable medium storing instructions that, when executed by at least one programmable processor, cause the at least one programmable processor to perform operations comprising:
initializing a score simulator tool for a consumer, the score simulator tool providing a plurality of predefined actions that represent future actions that can be taken by the consumer;
receiving, from the consumer, a selection of a future action from the plurality of predefined future actions;
performing, based on the selection and a real credit score of the consumer, a simulation to generate a simulated credit score of the consumer, the real credit score comprising credit bureau data characterizing financial transactions associated with the consumer, the simulated credit score representing an impact of the future action on the real credit score;
displaying the simulated credit score to the consumer, the simulated credit score representing a range of scores; and
displaying an explanation of the impact of the selection on the real credit score to produce the simulated credit score, the explanation based on a comparison of the simulated credit score to the real credit score.

12. A system comprising:
at least one programmable processor; and
a machine-readable medium storing instructions that, when executed by the at least one processor, cause the at least one programmable processor to perform operations comprising:
initializing a score simulator tool for a consumer, the score simulator tool providing a plurality of predefined actions that represent future actions that can be taken by the consumer;
receiving, from the consumer, a selection of a future action from the plurality of predefined future actions;
performing, based on the selection and a real credit score of the consumer, a simulation to generate a simulated credit score of the consumer, the real credit score comprising credit bureau data characterizing financial transactions associated with the consumer, the simulated credit score representing an impact of the future action on the real credit score;
displaying the simulated credit score to the consumer, the simulated credit score representing a range of scores; and
displaying an explanation of the impact of the selection on the real credit score to produce the simulated credit score, the explanation based on a comparison of the simulated credit score to the real credit score.

* * * * *